(12) United States Patent
Thomas et al.

(10) Patent No.: US 8,468,565 B2
(45) Date of Patent: Jun. 18, 2013

(54) METHOD AND APPARATUS FOR DISPLAYING INFORMATION IN RESPONSE TO MOTION PICTURE PROGRAMMING

(75) Inventors: Maryse Thomas, Victoria, MN (US); John G. Thomas, Victoria, MN (US)

(73) Assignee: Digital Network Shopping, LLC, Victoria, MN (US)

( * ) Notice: Subject to any disclaimer, the term of this patent is extended or adjusted under 35 U.S.C. 154(b) by 566 days.

(21) Appl. No.: 12/172,423

(22) Filed: Jul. 14, 2008

(65) Prior Publication Data

US 2008/0271089 A1 Oct. 30, 2008

Related U.S. Application Data

(63) Continuation of application No. 10/393,608, filed on Mar. 21, 2003, which is a continuation of application No. PCT/US01/29560, filed on Sep. 21, 2001.

(60) Provisional application No. 60/234,128, filed on Sep. 21, 2000.

(51) Int. Cl.
*G06F 3/00* (2006.01)
*H04N 7/173* (2011.01)

(52) U.S. Cl.
USPC ............................................. 725/61; 725/133

(58) Field of Classification Search
None
See application file for complete search history.

(56) References Cited

U.S. PATENT DOCUMENTS

| | | | |
|---|---|---|---|
| 5,438,355 A | 8/1995 | Palmer | |
| 5,572,643 A | 11/1996 | Judson | |
| 5,585,858 A | 12/1996 | Harper et al. | |
| 5,585,866 A | 12/1996 | Miller et al. | |
| 5,708,845 A | 1/1998 | Wistendahl et al. | |
| 5,721,829 A | 2/1998 | Dunn et al. | |
| 5,758,072 A | 5/1998 | Filepp et al. | |
| 5,796,967 A | 8/1998 | Filepp et al. | |
| 5,929,849 A * | 7/1999 | Kikinis | 725/113 |

(Continued)

FOREIGN PATENT DOCUMENTS

WO WO-03038428 A1 5/2003

OTHER PUBLICATIONS

"International Application Serial No. PCT/US01/29560 International Search Report", 2 pgs.

(Continued)

*Primary Examiner* — Brian Pendleton
*Assistant Examiner* — Jason K Lin
(74) *Attorney, Agent, or Firm* — Schwegman Lundberg & Woessner, P.A.

(57) ABSTRACT

Disclosed herein, in various embodiments, are methods and apparatus incorporating, among other things, the concept of using, in particular but without limitation, traditionally non-commercial programming as a medium for selling products or services on-line, and again in particular over the Internet. Using this concept, for example, an element identified in motion picture programming can be made identifiable by a viewer of the motion picture programming, and thereby enabling a viewer to determine the source, location, or other information referred to by the element. Using this concept, for example, a viewer viewing a soap opera is able to use a device to electronically select a element identified in the broadcast. In turn, information referred to by the content element can be displayed to the viewer, including purchase information. Using this particular concept of the invention, traditionally non-commercial programming can be efficiently used to indirectly advertise goods or services and offer them for sale on-line.

17 Claims, 3 Drawing Sheets

U.S. PATENT DOCUMENTS

| | | | |
|---|---|---|---|
| 6,002,394 | A | 12/1999 | Schein et al. |
| 6,005,561 | A | 12/1999 | Hawkins et al. |
| 6,016,141 | A | 1/2000 | Knudson et al. |
| 6,097,383 | A | 8/2000 | Gaughan et al. |
| 6,169,573 | B1 * | 1/2001 | Sampath-Kumar et al. ... 348/169 |
| 6,177,931 | B1 | 1/2001 | Alexander et al. |
| 6,282,713 | B1 * | 8/2001 | Kitsukawa et al. ............. 725/36 |
| 6,289,363 | B1 | 9/2001 | Consolatti et al. |
| 6,496,981 | B1 | 12/2002 | Wistendahl et al. |
| 6,529,506 | B1 | 3/2003 | Yamamoto et al. |
| 6,570,586 | B1 | 5/2003 | Kamen et al. |
| 6,570,587 | B1 | 5/2003 | Efrat et al. |
| 6,636,644 | B1 * | 10/2003 | Itokawa ........................ 382/243 |
| 6,912,726 | B1 | 6/2005 | Chen et al. |
| 6,941,154 | B1 | 9/2005 | Ritter |
| 6,988,244 | B1 * | 1/2006 | Honda et al. .................. 715/721 |
| 7,000,242 | B1 * | 2/2006 | Haber ............................. 725/43 |
| 7,017,173 | B1 * | 3/2006 | Armstrong et al. ............. 725/87 |
| 7,120,924 | B1 | 10/2006 | Katcher et al. |
| 7,134,132 | B1 | 11/2006 | Ngo |
| 7,249,367 | B2 | 7/2007 | Bove et al. |
| 7,269,837 | B1 * | 9/2007 | Redling et al. .................. 725/43 |
| 7,296,282 | B1 | 11/2007 | Koplar et al. |
| 7,313,802 | B1 | 12/2007 | Tomsen |
| 7,313,808 | B1 * | 12/2007 | Gupta et al. .................... 725/89 |
| 7,343,617 | B1 | 3/2008 | Katcher et al. |
| 7,367,042 | B1 | 4/2008 | Dakss et al. |
| 7,712,125 | B2 * | 5/2010 | Herigstad et al. ............. 725/141 |
| 7,899,705 | B2 | 3/2011 | Fuisz |
| 2002/0023271 | A1 | 2/2002 | Augenbraun et al. |
| 2002/0049983 | A1 | 4/2002 | Bove, Jr. et al. |
| 2002/0069405 | A1 | 6/2002 | Chapin et al. |
| 2003/0126621 | A1 | 7/2003 | Leak et al. |
| 2004/0261130 | A1 | 12/2004 | Leaks et al. |
| 2008/0271083 | A1 | 10/2008 | Robinson et al. |
| 2008/0271084 | A1 | 10/2008 | Robinson et al. |
| 2008/0271086 | A1 | 10/2008 | Robinson et al. |
| 2008/0271087 | A1 | 10/2008 | Robinson et al. |
| 2008/0271088 | A1 | 10/2008 | Robinson et al. |
| 2008/0276285 | A1 | 11/2008 | Robinson et al. |
| 2008/0276286 | A1 | 11/2008 | Robinson et al. |
| 2012/0240139 | A1 | 9/2012 | Thomas et al. |
| 2012/0240152 | A1 | 9/2012 | Thomas et al. |

OTHER PUBLICATIONS

"U.S. Appl. No. 12/172,459, Response to Non Final Office Action mailed Jun. 18, 2009", 12 pgs.

"U.S. Appl. No. 10/393,608, Preliminary Amendment filed Mar. 21, 2003", 1 pg.

"U.S. Appl. No. 10/393,608, Appeal Brief filed Mar. 29, 2010", 28 pgs.

"U.S. Appl. No. 10/393,608, Examiner Interview Summary mailed Mar. 6, 2008", 2 pgs.

"U.S. Appl. No. 10/393,608, Examiner's Answer to Appeal Brief mailed Jun. 22, 2010", 30 pgs.

"U.S. Appl. No. 12/172,393, Non-Final Office Action mailed Nov. 17, 2009", 25 pgs.

"U.S. Appl. No. 12/172,393, Response filed Oct. 22, 2009 to Restriction Requirement mailed Sep. 22, 2009", 6 pgs.

"U.S. Appl. No. 12/172,393, Restriction Requirement mailed Sep. 22, 2009", 5 pgs.

"U.S. Appl. No. 12/172,399, Non-Final Office Action mailed Jan. 4, 2010", 22 pgs.

"U.S. Appl. No. 12/172,399, Preliminary Amendmentt filed Aug. 7, 2008", 8 pgs.

"U.S. Appl. No. 12/172,399, Response filed Nov. 30, 2009 to Restriction Requirement mailed Oct. 28, 2009", 7 pgs.

"U.S. Appl. No. 12/172,399, Restriction Requirement mailed Oct. 28, 2009", 5 pgs.

"U.S. Appl. No. 12/172,404, Non-Final Office Action mailed Dec. 1, 2009", 26 pgs.

"U.S. Appl. No. 12/172,407, Non-Final Office Action mailed Dec. 31, 2009", 24 pgs.

"U.S. Appl. No. 12/172,435, Final Office Action mailed Jan. 4, 2010", 52 pgs.

"U.S. Appl. No. 12/172,435, Response filed Aug. 27, 2009 to Non Final Office Action mailed Apr. 27, 2009", 12 pgs.

"U.S. Appl. No. 12/172,447, Final Office Action mailed Jan. 4, 2010", 25 pgs.

"U.S. Appl. No. 12/172,447, Response filed Sep. 1, 2009 to Non Final Office Action mailed Jun. 1, 2009", 9 pgs.

"U.S. Appl. No. 12/172,459, Final Office Action mailed Jan. 7, 2010", 32 pgs.

"U.S. Appl. No. 12/172,459, Response filed Sep. 18, 2009 to Non Final Office Action mailed Jun. 18, 2009", 12 pgs.

U.S. Appl. No. 13/464,559 , Response filed Nov. 21, 2012 to Non Final Office Action mailed Aug. 23, 2012, 10 pgs.

U.S. Appl. No. 13/464,559, Examiner Interview Summary mailed Dec. 28, 2012, 3 pgs.

U.S. Appl. No. 13/464,559, Final Office Action mailed Feb. 14, 2013, 23 pgs.

U.S. Appl. No. 13/464,559, Non Final Office Action mailed Aug. 23, 2012, 21 pgs.

U.S. Appl. No. 13/464,616, Examiner Interview Summary mailed Dec. 21, 2012, 3 pgs.

U.S. Appl. No. 13/464,616, Final Office Action mailed Dec. 7, 2012, 14 pgs.

U.S. Appl. No. 13/464,616, Non Final Office Action mailed Aug. 20, 2012, 11 pgs.

U.S. Appl. No. 13/464,616, Response filed Nov. 20, 2012 to Non Final Office Action mailed Aug. 20, 2012, 9 pgs.

Canadian Application Serial No. 2,423,179, Office Action mailed Sep. 24, 2012, 4 pgs.

International Application Serial No. PCT/US01/29560, International Preliminary Examination Report mailed Dec. 21, 2004, 3 pgs.

Gravel, Ken, et al., "Optimizing VBI Data Integrity in PDR300 MPEG Based Profiles,", (Aug. 6, 1998), 8 pgs.

* cited by examiner

METHOD AND APPARATUS FOR DISPLAYING INFORMATION IN RESPONSE TO MOTION PICTURE PROGRAMMING

CROSS-REFERENCE TO RELATED APPLICATION

This application is a continuation of commonly assigned Robinson et al. U.S. patent application Ser. No. 10/393,608 filed Mar. 21, 2003, which is a continuation of PCT/US01/29560 filed Sep. 21, 2001 and published in English as WO 02/25556 A1 on Mar. 28, 2002, which claims priority from U.S. provisional application 60/234,128 filed Sep. 21, 2000, which applications and publications are hereby incorporated by reference.

TECHNICAL FIELD OF THE INVENTION

The present invention pertains generally to displaying information, and in particular to method and apparatus for displaying information in response to motion picture programming.

BACKGROUND OF INVENTION

Broadcast television has long existed as a premier medium for the advertisement and sale of goods and services. The overwhelming volume of advertising and sales is conducted on television using advertising spots, typically running between 15 and 60 seconds each, that are broadcast during commercial breaks from regularly scheduled non-commercial programming or news programs.

As used herein, the term "non-commercial programming" means programming that is predominantly artistic in purpose and content and does not contain direct appeals to consumers for the purchase of a product, such as pricing information or information pertaining to where or how to purchase an item or service for sale. Non-commercial programming may, however, include "product placements" such as brand name products or services that appear in such programming but are not expressly offered for sale. Non-commercial programming may be, for example and without limitation, soap operas, made for TV movies, movies made for release in theaters and later broadcast on TV, sit-coms, TV dramas, documentaries, and game shows.

As used herein, the term "commercial programming" means programming that is predominantly commercial in purpose and content, such as a television advertisement for a product or service that may or may indicate where such product or service may be purchased, or the pricing of such product or service.

SUMMARY OF THE INVENTION

As described further herein below, the present invention, in various embodiments, provides method, apparatus and software for the displaying information about an element identified in motion picture programming in response to the motion picture programming.

DETAILED DESCRIPTION OF THE INVENTION

Figure 1:
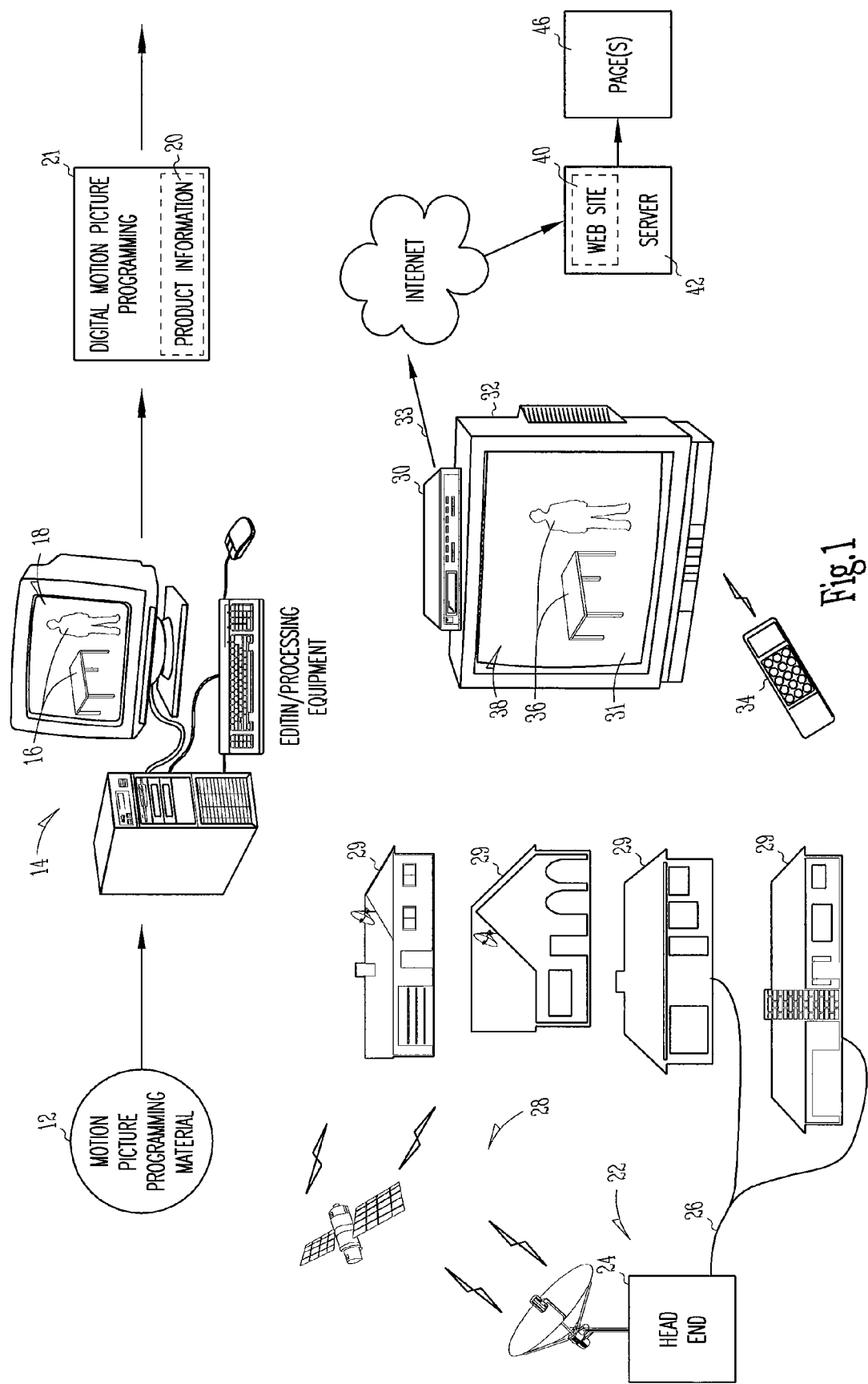
FIGS. 1-2 illustrate example embodiments of the apparatus of the invention.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only be the appended claims.

Method Embodiments

As described below in greater detail, the invention exploits, in various embodiments described below, the concept of using, in particular but without limitation, traditionally non-commercial programming as a medium for selling products or services on-line, and again in particular over the Internet. Using this concept, for example, items used for props or settings of a scene in motion picture programming are made electronically identifiable by a viewer of the programming, and thereby enabling a viewer to determine the source or location of the goods or setting or other thing for sale, using an electronic system deployed in part as a portion of the viewer's television viewing equipment.

Using this concept, for example, a user viewing a soap opera is able to use a hand held device to electronically point to a dress or item of jewelry worn by an actress, and selects the dress or jewelry. In turn, the user is taken to a web site that offers the dress for sale. This concept can also be used to find, for example but without limitation, travel packages to a locale featured in a motion picture program, or the names of hotels or lodging near by.

Using this particular concept of the invention, traditionally non-commercial programming can be efficiently used to indirectly advertise goods or services and offer them for sale on-line.

According to one embodiment of the invention, there is provided a method for selling products or services using a television-viewing medium. The methods provides for 1) producing motion picture programming with at least one element in at least one scene of the motion picture programming, 2) recording digital information about the element, 3) broadcasting the motion picture programming, 4) receiving the broadcast and displaying the motion picture programming on a television display, 5) in response to viewing the motion picture programming on the television display, a viewer electronically selecting the element shown in the at least one scene, and 5) using the recorded digital information, linking the viewer to a web site configured to permit purchase or ordering of the element on-line.

According to one embodiment of the method, the programming is non-commercial programming. According to another example embodiment, an element is an item worn by a live actor in the motion picture programming, and for example the item is selected from the group of: a item of jewelry, a garment or an accessory. In another embodiment, the element is a hairstyle, hairpiece or cosmetic worn by a live actor in the motion picture programming. In yet another embodiment, the element is a prop used in the motion picture programming, and is selected for example from the group of: a home furnishing, home decoration, fixture or appliance. In yet another embodiment, the element is a real world setting, and the setting is for example is selected from the group of: city location, rural location, beach location or water location.

In still another example embodiment, the element is a device used in the motion picture programming, and the device is selected from the group of: an automobile, household appliance, tool or consumer product.

According to one example embodiment, the information is recorded during the editing process of the motion picture programming. For example, during the editing process of a movie, game show or soap opera. In one approach, the information is recorded after the motion picture programming is shot but before the broadcast of the motion picture programming. For instance, in the editing process, elements are identified in each scene of the programming, and information about the identified elements recorded. This may be accomplished, for example, using a software and/or hardware system that allows an editor to view each scene on a screen display and using a pointing device identify and element in a scene, whereupon the system creates recorded data that can be later used to identify the element when it is selected by a viewer during a broadcast. The system is, in one example, digital, providing that scenes are represented in digital data, and edge detection software operative in the system automatically identifies the edges of an element.

Using another approach, the information is recorded prior to the motion picture programming being shot, for example made possible if the position of the elements in each scene is known in advance.

In still another sample embodiment, the information is broadcast with the motion picture programming, and may, for example, be included with an analog television signal carrying the motion picture programming. Alternatively, the information is included with a digital television signal carrying the motion picture programming. The motion picture programming may be, for example, stored in a digital format for broadcasting, such that the information is stored as part of the digital motion picture programming data. In one example embodiment, the information is stored separately from the motion picture programming.

According to yet still another example embodiment, the information is referenced after a viewer selects an item and is used to identify which element the viewer has chosen. In such an example embodiment, for instance, the information specifies the location of the element in a scene of the motion picture programming.

In still another example embodiment of the methods of the invention, the viewer selects a position on the motion picture programming as it is displayed on the television display, and information about the position of the element and the time the element was selected is used to determine the identity of the element using the information stored concerning the location of the element in a scene of the motion picture programming.

In yet another embodiment, a viewer selects an element using a hand held remote control device. Moreover, in another example configuration, there is provided a storage device holding viewer information including credit card numbers, with the storage device being inserted into the remote control device. The hand held device may further be configured to store information about any selected element for later use to purchase the element, for example by storing information obtained from a set top box concerning the element, or concerning where the element was located in the motion picture. According to yet another example embodiment, the set top box stores information pertaining to selected element for later retrieval to use in purchasing an element.

In still another example embodiment signals from the hand held remote are received at a set top device. The hand held remote control device can be used with one or more different set top devices.

In yet another example embodiment, the method provides for receiving the broadcast at a set top device and in response to a viewer's input freezes framing an image currently being displayed prior to the viewer selecting an element. The freeze-framed image is retrieved for later display and use to select an element.

Other embodiments of the invention entail broadcasting motion picture programming with at least one element in at least one scene of the motion picture programming, wherein the broadcast includes the motion picture programming and the signal may in one example embodiment contain further include non-displayable encoded information about how to locate a web site containing information about the element. In one alternative example embodiment, the encoded information is carried in an analog broadcast signal, and/or for example, the encoded information is watermarked in the broadcast signal. Further, the encoded information can in one embodiment be carried in a digital broadcast signal. Alternatively, information about the element is not carried in the broadcast signal but stored in database and referenced later to help identify an element.

On the viewer's end, the broadcast of the motion picture programming is received and is displayed on a television display, in response to viewing the motion picture programming on the television display, the viewer electronically selects an element shown in the at least one scene of the motion picture programming, and, using pre-recorded digital information either carried with the signal or retrieved from a database, the viewer is linked to a web site containing information about the element.

In still another example embodiment, a web site host uses the pre-recorded digital information to link a viewer to a web site containing information about an element shown in at least one scene of a motion picture programming.

On the production end, in one example embodiment, motion picture programming is produced with at least one element in at least one scene of the motion picture programming. Digital information about the element sufficient to link a viewer of a television broadcast of the motion picture programming to a web site containing information about the element is then recorded.

According to one particular example embodiment, the x-y coordinates of the pixel locations corresponding to the position of elements in the motion picture programming at various different times, for example successive scenes of the motion picture, are recorded to create a mapping of elements to their x-y locations in the scenes. This allows a user viewing the scenes on a television viewing device to later select a position on a frame of the motion picture programming and thereby electronically specify the x-y coordinate location of an element in the frame, which x-y coordinate location can then be used to determine what the corresponding element in the scene is by reference to the prerecorded information. Such prerecorded x-y coordinate information may, for example, be stored in a web server, indexed according to scene, or according to frames of a scene or some other time-based index that can be used to identify a particular instance in the motion picture. A viewer can then use, for instance, a set top box device to select an element in a scene being viewed, and in turn the set top box produces the x-y coordinates of that element in the scene, and a designation of the instance in time or frame or other segment that the scene occurred relative to the beginning and end of the motion picture. This information is used by the web server to identify the element chosen by the user, similarly to how user activated "buttons" are mapped and used in graphical user interface programming.

According to an example embodiment of the broadcast method, the motion picture programming is distributed to one or more over-the-air or satellite or cable broadcast networks, or distributed to an Internet broadcast narrowcast system, such that programming may be viewed on a television display device either through a convention television system, or on the monitor of a personal computer or workstation that is being used as a television display device. Accordingly, as used herein, the term "television display device" refers to any device capable of displaying motion picture programming, such as a conventional television tube, a flat panel television display for instance using liquid crystal technology, or the monitor of a computer system whether tube liquid crystal based or otherwise.

According to still another embodiment of the invention, one or more web servers or computing systems are used to collect viewing and purchasing data for viewers purchasing goods or services using the above described method. In one example embodiment, each viewer using the system is registered electronically at a web server system, and each time that viewer selects an element for investigation of a purchase, or actual purchase, the identity of that viewer, or at least some demographically information concerning the viewer such as their geographical location or age or gender, an identification of the motion picture programming from which the element is selected, and any actual sales information, is recorded on the server system for later reference, for example to "mine" information about viewing habits or purchasing habits of registered viewers.

According to one example method, each time a viewer selects an element that they wish to purchase, the viewer is asked to enter a personal identification number or other password and/or a user name if such is not pre-known by virtue of pre-stored information for example in the viewer's remote control device or set top box. The password can then be used to release credit card or other credit or debit or cash card or account information that allows the viewer to complete a purchase transaction electronically.

According to yet other embodiments of the methods of the invention, the above-described methods can be implemented in whole or in part using or in combination with other systems. For instance, the methods may be implemented in such a way that broadcast motion picture programming is synchronized with a web-based application. Using this approach, for instance, the web-based application would be informed of or in synchrony with which scenes of the motion picture programming were being broadcast and viewed by the viewer. Knowing the scene being viewed, and using a pre-recorded mapping of the location of certain elements in each scene, or frame of a scene if the element moves position during the scene, allows that the web server can identify an element selected by a viewer provided that the user's system, located for instance and most typically in a user's home, can specify the x-y coordinates of the element in a scene or at a certain point in the scene.

In an alternative embodiment, the actual motion picture programming signal is itself encoded with information on the identity of an element, for example such that the element has an un-displayed "tag" of data that can be accessed when the element is selected with a selection device, and then used to facilitate a purchase of the element. For example, a viewer may select a tagged element, and the tag information then used to direct the viewer to a web site offering that element for sale, and, more particularly in one example embodiment, to a page of the web site that contains purchasing information for the element. Such tags may be incorporated, for example, in data formats such as MPEG data containing the motion picture programming, or other digital data formats. Alternatively, such data may be encoded into an analog broadcast signal in the blanking period or watermarked into the actual displayed content, such that the watermarking can be read by a set top box unit that is forwarding the signal to the television viewing device. In the case of tagged elements, one aspect is that most or all of the information that is required to identify the element is included with the broadcasted signal. This is in contrast to requiring reference to an independently maintained database to identify the element, as for example described above where the element is identified by mapping a location of the element to a database defining where elements are found in a motion picture. Of course, one example embodiment may use both tagging and independently stored data to accomplish this function.

As used herein, the term "set top" box or unit or device shall mean a signal processing apparatus that can be stand alone or incorporated bodily into a television viewing device or other electronic apparatus that is used to view motion picture programming. For example, a set top box may be of the form typically used by cable or satellite television and Internet access systems, where signals are delivered from a head end or satellite system or otherwise delivered to the set top device and thereafter converted into signals displayable as motion picture programming on a television viewing device, or displayed as web pages in the case where Internet access if provided, or both simultaneously.

According to yet another embodiment, other methods of identifying the element are possible and the invention is in no way limited in the respect of how the element is identified in order to facilitate a sale.

It shall be understood that while the invention has been described in various embodiments above as implemented on the Internet with respect to on-line sales, other networks can be substituted, such as a private network that does not implicate the Internet. Such a network may be an "intranet" or "extranet" or simply a wide area network. Alternatively, a point-to-point system that is not strictly a network could also be used as the medium to send purchase requests to processing and distribution center and/or computer system.

According to still another embodiment of the invention, the invention is applied not only to non-commercial motion picture programming, but also to commercial programming, allowing, for example but not with limitation, multiple elements for sale to be featured in a motion picture commercial programming, and allowing a user to select one or more of the elements to effectuate a sale of the item.

According to yet still another example embodiment of the invention, the viewer is provided with information concerning where an element may be purchased, or other information such as pricing information, but not given an opportunity to purchase the element on-line.

According to yet another embodiment of the invention, one or more still images of scenes taken from motion picture programming is stored in a storage location such as a web server on the Internet. These still images are, in one example embodiment, taken from the motion picture programming prior to broadcast, and one or more elements are identified on the still images in the same manner as specified above. Upon viewing such programming via a broadcast, a user is informed with visible instructions forming part of the displayed programming to visit a web site where such still images from the broadcast may be viewed and wherein elements of the images may be selected in order to purchase or otherwise obtain information on such elements. According to an alternative embodiment, pressing one or more buttons on the remote control unit automatically brings a user to the web site where the still images can be viewed and elements from scenes in the images can be selected for purchase. In this embodiment, therefore, it is unnecessary to know where within the programming the viewer has activated the system to go to the web site, as the viewer can select the scene of interest from, for example, one or a gallery of scenes stored at the site. In this embodiment, therefore, no synchronization or direct correlation between the actual broadcast and the elements for sale on the web site is necessary. According to one example embodiment, selecting and "clicking on" a scene in a program takes the user to the web site that provides access to the corresponding still images and purchasing information and infrastructure.

According to still another example embodiment, the programming may be distributed not only as a broadcast, but also in the form of a DVD disc, VHS tape or MP3 or other data storage format. In such an embodiment, the invention works in a like manner as described above in such embodiments where synchronization with a live broadcast is not necessary to the described operation. Instead, the programming content is delivered to the system via the recording media or source such as a media server.

According to still another embodiment, the invention is adapted to be used for audio programming, wherein a user may select an audio element of audio programming using a select device such as a button, in order to obtain information or purchase of an item or service related to the audio element, in the same manner as is described in the various embodiments above. For example, a user may select a "song" that is played in an audiovisual broadcast by pushing a "audio selection" button or on-screen select element, and receive information concerning the audio content or the product or service referred to by the content. In such a manner, a radio broadcast or music recording or a movie soundtrack may be used as a basis for sale of a product or service in the same manner as described above with respect to visual elements in programming material.

According to another example embodiment of the methods of the invention, the invention is adapted for operation to view or listen to programming on personal digital assistants (PDA's), cellular telephones handheld/portable televisions, computers and the like.

According to one example embodiment, programming may be obtained from various sources including but not limited to DVD, VHS, SetTop Memory/Disk, Live TV, Wireless, Movie Theater, Radio, Web Radio, Web Video, Web Sites, Post-Sale Promotions, Print Materials, and Dedicated Video Print and Audio Catalogs. Scene selection and retention may be accomplished a custom set top box, conventional and commercially available set top boxes, memory devices, web links, PDA's an digital telephones. Scene review may be accomplished by visual review of selections, with searching by product type, show, show type and other familiar categorizations. Product selection may be obtained by a web set operated to display goods for a number of different advertisers/companies, or from the actual advertisers own web site. Also, purchase an item may be accomplished by use of a central web site or operations center, or by the actual advertisers, or a hybrid for example implemented in XML programming language.

Apparatus Embodiments

Referring now to FIG. 1, there is shown one example embodiment of the system and apparatus of the invention. Raw motion picture programming 12 is obtained by a "shooting" process that uses analog or digital filming technology, such as a video camera or an emulsion film camera, or a digital camera. The raw programming 12 is edited and processed using editing equipment 14, wherein elements 16 in a scene 18 are identified during the editing process, or after final editing. In this example embodiment, "product" information 20 about each element, such as identification information for the element and/or where it can be purchased on the Internet is then encoded in digital form as part of a digital representation 21 of the programming material.

Such digital programming material is then broadcast using a broadcast system 22, including a head end 24 that transmits the digital programming material by cable system 26 or satellite system 28, to a viewer's location 29, such as their home. At the viewer's location, a set top box 30, either stand alone or incorporated into television system, receives the digital programming material, typically carried over the air or cable in the form of a modulated analog carrier. The set top box 30 receives the programming, and produces a signal or data that produces a display 31 of the programming material on a television display 32. Set top box 30 is in one embodiment connected to the Internet by a POTS telephone line 33, or other Internet connection such as ISDN or DSL, and includes circuitry responsive to a hand held remote unit 34, which can be used to direct the set top box to overlay an image of a pointer 36 on a scene 38 of the programming material, and allowing a viewer to point to and electronically select an element in a scene. Remote unit 34 further includes, in one example embodiment, a keypad, a "purchase" button, and a toggle button to allow a viewer to toggle between different sets of customer information (not shown). According to one example embodiment, an indication that the element has been selected, and indeed is available to be selected, is also overlaid on the image of the scene, such as by changing a color or brightness of the element, or otherwise indicating visually that the element has been selected by the user. In one example embodiment, the hand held device allows a viewer to first freeze frame, or capture, an image of the scene, so that selection of the element is done a still video image, as opposed to a moving image. Moreover, the still video image may be stored for later recall, for example at the end of a broadcast, or at least an index to a point in the broadcast is made such that the user may later view an image from the scene obtained from a source other than the original broadcast, such as a recording of the broadcast made locally at the viewer's location, or a recording kept on a web server on the Internet or in some other remote database.

Once an element has been identified, the product information included in the programming signal is used to link a viewer to a web site 40 that is supported by a web server 42, in this example over the Internet 44. In one embodiment, the viewer is taken directly to a page(s) or other portion(s) 46 of a web site 40, where the element is offered for sale or otherwise promoted. Web server 42 or another one or more servers may host the web site. Upon entering a password into the hand held remote unit 34, the viewer's account information, held in a storage device located in the hand held remote unit 34, set top box 30, or in another data storage location such as on the Internet, is provided to the web site to effectuate a sale. Page(s) 46 are displayed either on display 31, or alternately another display device at the viewer's location.

In addition, web server 42 collects data concerning which scenes are freeze framed or which elements are selected by each viewer using the system, so that information on the viewing and buying habits of viewers can be assembled. Such viewers may be kept track of by name and/or address or other identification unique to them, or more generically by some designation of the location they are in when using the system, or other information that allows demographically information to be accumulated.

Figure 2:
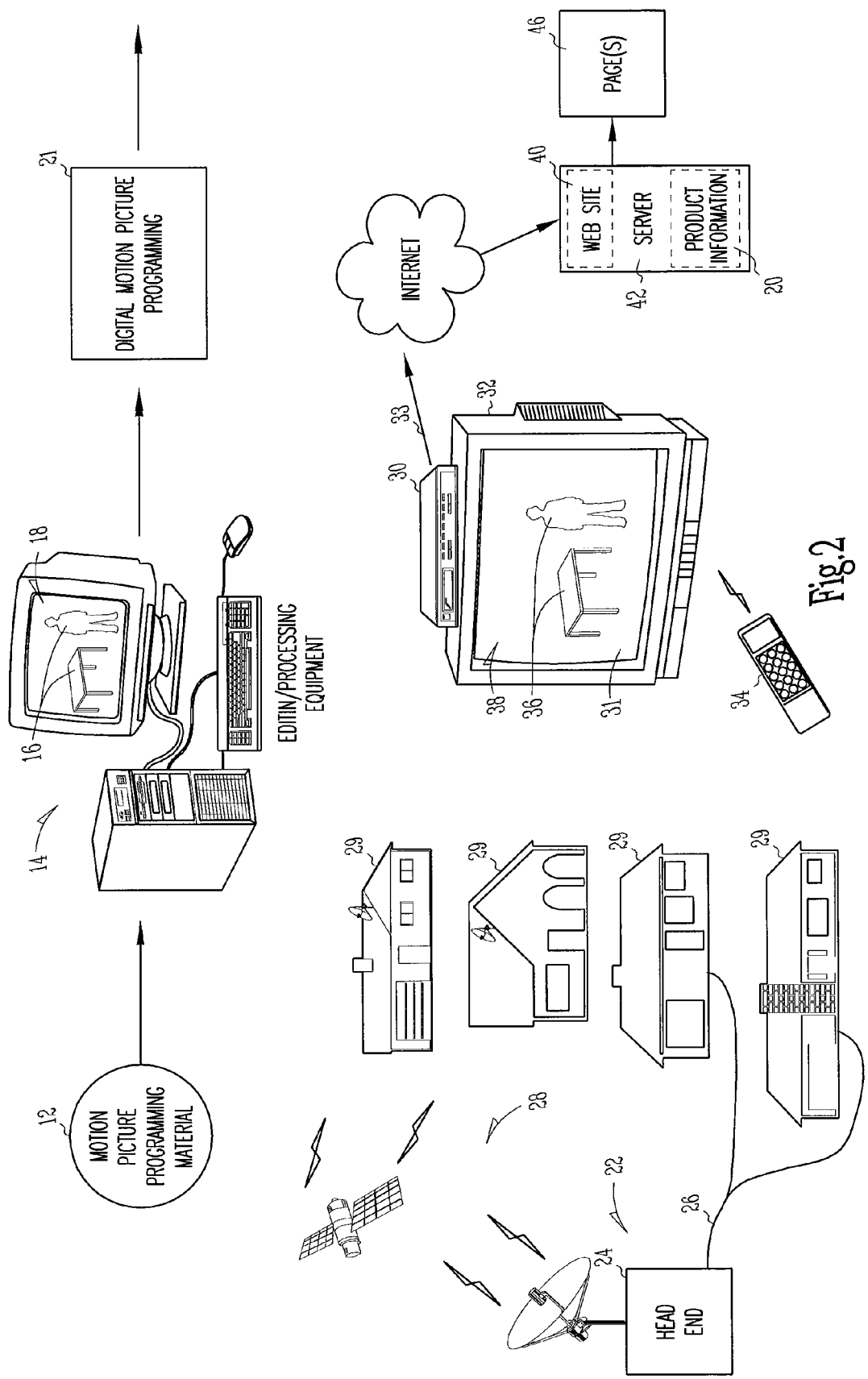

In an alternative embodiment shown in FIG. 2, product information concerning an element is kept on the server 42 mapped according to the x-y location of elements in each scene or frame of programming, and x-y coordinate data generated by the set top box 30 is sent to the server 42 for it to use in determining the product information for the element and in turn linking the user to a web site offering information or sale of that element.

Figure 3:
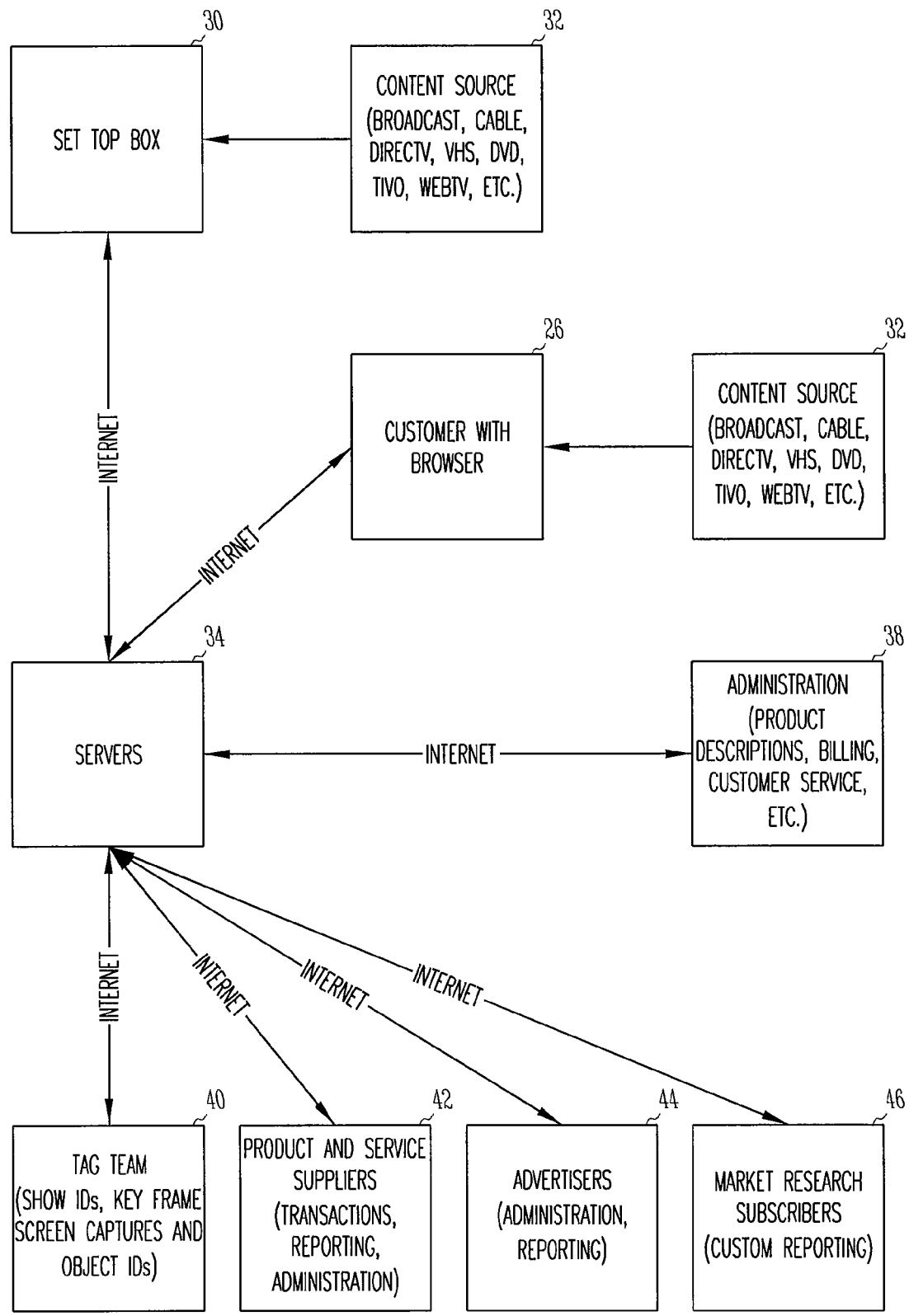
FIG. 3 illustrates another example embodiment of the apparatus of the invention.

Referring now to FIG. 3 there is illustrated another example embodiment of the invention. A set top box 30 receives content from a content source 32. One or more servers 34 are connected to the set top box 30. In an alternate or combined configuration, content source is supplied from source 32 to a browser configuration on a client computer 36. The server(s) 34 provide administrative functions accessible over the internet from a client computer 38. Content data is uploaded into the server(s) 34 from a Tag source 40, which shows IDs, Key Frame Screen Captures and Object IDs, and is also connected to product and server suppliers computer equipment 42, for completing sales transactions of advertised items, reporting and administration. Additional functions are accessible by Advertiser systems 44, such as administrative and reporting features. Other functions are accessible to market research subscriber systems 46, such as reports indicating demographic sales data. In this embodiment, for example, the key frames are frames from programming selected to be accessed on the Internet by customers, such as described above with respect to the methods and apparatus described herein.

As used herein, the term "storage medium" shall mean without limitation any media that can be used to store or transport an analog or digital signal, such as magnetic media, compact disc media, or copper or optical or other signal transport media that can sustain a signal in transport.

Thus, the invention as described above provides, in various embodiments, methods and apparatus incorporating, among other things, the concept of using, in particular but without limitation, traditionally non-commercial programming as a medium for selling products or services on-line, and again in particular over the Internet. Using this particular concept of the invention, traditionally non-commercial programming can be efficiently used to indirectly advertise goods or services and offer them for sale on-line.

What is claimed is:

1. A method comprising:
    identifying an element in motion picture programming prior to broadcast;
    obtaining a still image from the motion picture programming, wherein the still image contains the identified element;
    storing the still image having the identified element in a gallery of scenes stored separately from the motion picture programming, wherein the separate storage is on a web server and a portion of the gallery of scenes is accessible from a website served by the web server, and where the motion picture programming is not accessible from the website;
    storing digital information referred to by the identified element;
    displaying the still image to a viewer in response to a viewer selection, from the portion of the gallery of scenes using the website, of a scene of interest containing the still image, wherein there is no synchronization or direct correlation between the motion picture program broadcast and the elements on the website to generate the still images from the gallery of scenes, wherein the viewer selection comprises pressing one or more buttons on a remote control unit that automatically brings a user to the website where the still images can be viewed and elements from scenes in the image can be selected for purchase; and
    displaying the stored digital information referred to by the identified element to the viewer in response to the viewer viewing the still image containing the identified element and selecting the identified element in the still image, wherein the still image and the digital information referred to by the identified element are colocated prior to the viewer selecting the identified element in the still image.

2. The method of claim 1, wherein the motion picture programming is delivered to the viewer through a television broadcast; and
    wherein the still image containing the identified element is displayed to the viewer through a web-based application.

3. The method of claim 1, wherein the digital information is referred to by the identified element, but different from the identified element.

4. The method of claim 1, wherein the digital information referred to by the identified element is stored during the editing process of the motion picture programming.

5. The method of claim 1, wherein the digital information referred to by the identified element is stored after the motion picture programming is recorded, but before the delivery of the motion picture programming to the viewer.

6. The method of claim 1, wherein the digital information referred to by the identified element is stored before the motion picture programming is recorded.

7. The method of claim 1, wherein the motion picture programming is stored in a digital format for delivery to the viewer, and the digital information referred to by the identified element is stored as part of the digital motion picture programming data.

8. A system comprising:
    a processor coupled to a viewing device, the viewing device including an input device, the processor configured to:
    (a) store a still image obtained from motion picture programming in a gallery of scenes stored separately from the motion picture programming, wherein the separate storage is on a web server and a portion of the gallery of scenes is accessible from a website served by the web server, wherein the motion picture programming is not accessible from the website, and wherein the still image contains an element identified in the motion picture programming prior to broadcast;
    (b) store digital information referred to by the identified element;
    (c) deliver to the viewing device the still image containing the identified element in response to a viewer selection, from the portion of the gallery of scenes using the website, of a scene of interest containing the still image, wherein there is no synchronization or direct correlation between the motion picture program broadcast and the elements on the website to generate the still images from the gallery of scenes, wherein the viewer selection comprises pressing one or more buttons on a remote control unit that automatically brings a user to the website where the still images can be viewed and elements from scenes in the image can be selected for purchase; and (d) deliver to the viewing device at least some of the stored digital information referred to by the identified element; and a computer program operating on the viewing device, the computer program configured to deliver at least a portion of the stored digital information referred to by the identified element to a viewer in response to the viewer selecting the identified element in the still image using the input device, wherein the still image and the digital information referred to by the identified element are colocated prior to the viewer selecting the identified element in the still image using the input device.

9. The system of claim 8, wherein the motion picture programming is delivered to the viewer through a television broadcast; and wherein the computer program operating on the viewing device is configured to display the still image containing the identified element to the viewer.

10. The system of claim 8, wherein the processor is configured to store the digital information referred to by the identified element during the editing process of the motion picture programming.

11. The system of claim 8, wherein the processor is configured to store the digital information referred to by the identified element after the motion picture programming is recorded, but before the delivery of the motion picture programming.

12. The system of claim 8, wherein the processor is configured to store the digital information referred to by the identified element before the motion picture programming is recorded.

13. The system of claim 8, wherein the motion picture programming is stored in a digital format for delivery to the viewer, and the digital information referred to by the identified element is stored as part of the digital motion picture programming data.

14. The method of claim 1, wherein the identifying the element in the motion picture programming includes automatically identifying the element in the motion picture programming.

15. The method of claim 14, wherein the automatically identifying the element in the motion picture programming includes automatically identifying the edges of the element in the motion picture programming.

16. The method of claim 1, wherein the displaying the still image to the viewer and the displaying the stored digital information referred to by the identified element to the viewer include using a first device, and wherein the still image and the digital information referred to by the identified element are collocated remote from the first device prior to the viewer selecting the identified element in the still image.

17. The method of claim 1, wherein the displaying the still image to the viewer and the displaying the stored digital information referred to by the identified element to the viewer include using a first device, and wherein the still image and the digital information referred to by the identified element are collocated on the first device prior to the viewer selecting the identified element in the still image.

* * * * *